US010094329B2

United States Patent
Swasey et al.

(10) Patent No.: US 10,094,329 B2
(45) Date of Patent: Oct. 9, 2018

(54) STATIC GASKET AND METHOD OF CONSTRUCTION THEREOF

(71) Applicant: Federal-Mogul Corporation, Southfield, MI (US)

(72) Inventors: Thomas Swasey, Okemos, MI (US); Christopher J. Magewick, Livonia, MI (US)

(73) Assignee: Federal-Mogul LLC, Southfield, MI (US)

( * ) Notice: Subject to any disclaimer, the term of this patent is extended or adjusted under 35 U.S.C. 154(b) by 511 days.

(21) Appl. No.: 14/300,694

(22) Filed: Jun. 10, 2014

(65) Prior Publication Data

US 2014/0361495 A1    Dec. 11, 2014

Related U.S. Application Data

(60) Provisional application No. 61/833,301, filed on Jun. 10, 2013.

(51) Int. Cl.
*F02F 11/00* (2006.01)
*B23K 26/20* (2014.01)
(Continued)

(52) U.S. Cl.
CPC ............ *F02F 11/002* (2013.01); *B23K 26/20* (2013.01); *B23K 31/02* (2013.01); *B32B 37/18* (2013.01);
(Continued)

(58) Field of Classification Search
CPC ................. F16J 15/0818; F16J 15/0825; F16J 2015/085; F16J 2015/0862; F16J 2015/0875
See application file for complete search history.

(56) References Cited

U.S. PATENT DOCUMENTS 3,653,673 A * 4/1972 Green ........................ 277/612
4,272,085 A * 6/1981 Fujikawa et al. ............ 277/594
(Continued)

FOREIGN PATENT DOCUMENTS

BE    632921 A     10/1963
DE    19829058 A1   1/2000
(Continued)

OTHER PUBLICATIONS

International Search Report dated Nov. 4, 2014 (PCT/US2014/041700).

*Primary Examiner* — Gilbert Y Lee
(74) *Attorney, Agent, or Firm* — Robert L. Stearns; Dickinson Wright, PLLC

(57) ABSTRACT

A metal static gasket and method of construction thereof is provided. The gasket includes at least one metal layer. At least one of the metal layers has opposite sides with at least one through opening extending through the opposite sides, with the through opening being configured to register with an opening to be sealed. At least one metal layer of the gasket has least one raised annular seal bead extending adjacent the through opening. A plurality of protrusions extend outwardly from at least one of the opposite sides, wherein the plurality of protrusions are formed from separate pieces of metal from the at least one metal layer and are individually fixed to the at least one metal layer via separate bond joints.

20 Claims, 6 Drawing Sheets

(51) Int. Cl.
*B23K 31/02* (2006.01)
*B32B 37/18* (2006.01)
*F16J 15/08* (2006.01)

(52) U.S. Cl.
CPC ....... *F16J 15/0818* (2013.01); *F16J 15/0825* (2013.01); *F02F 2200/00* (2013.01); *F16J 2015/085* (2013.01); *F16J 2015/0862* (2013.01); *F16J 2015/0868* (2013.01); *Y10T 29/49826* (2015.01); *Y10T 156/10* (2015.01)

(56) References Cited

U.S. PATENT DOCUMENTS

| | | | |
|---|---|---|---|
| 5,755,447 | A | 5/1998 | Hagiwara et al. |
| 6,164,661 | A | 12/2000 | Kakuta et al. |
| 6,255,581 | B1 | 7/2001 | Reis et al. |
| 6,688,606 | B2 | 2/2004 | Hohe et al. |
| 6,715,770 | B2 | 4/2004 | Schmitt |
| 7,129,421 | B2 | 10/2006 | Reis et al. |
| 8,100,411 | B2 | 1/2012 | Schumacher et al. |
| 2001/0048202 | A1 | 12/2001 | Zerfab et al. |
| 2002/0135135 | A1 | 9/2002 | Fujino et al. |
| 2003/0062692 | A1 | 4/2003 | Diez et al. |
| 2005/0140096 | A1 | 6/2005 | Golombek et al. |
| 2005/0269788 | A1* | 12/2005 | Grunfeld ................ 277/592 |
| 2006/0178708 | A1* | 8/2006 | Rorvick et al. ................ 607/36 |
| 2007/0249152 | A1 | 10/2007 | Tanaka et al. |
| 2008/0093808 | A1* | 4/2008 | Quick et al. ................ 277/595 |
| 2012/0098210 | A1* | 4/2012 | Schmitt et al. ................ 277/593 |
| 2013/0087980 | A1* | 4/2013 | Lafrenz et al. ................ 277/593 |

FOREIGN PATENT DOCUMENTS

| | | |
|---|---|---|
| DE | 10137594 A1 | 2/2003 |
| DE | 102004061964 A1 | 7/2006 |
| EP | 1243820 A2 | 9/2002 |
| JP | H0371155 U | 7/1991 |
| JP | H10339372 A | 12/1998 |
| JP | 2002286141 A | 10/2002 |
| JP | 2005114166 A | 4/2005 |
| JP | 2005164039 A | 6/2005 |
| JP | 2007288013 A | 11/2007 |

\* cited by examiner

STATIC GASKET AND METHOD OF CONSTRUCTION THEREOF

CROSS-REFERENCE TO RELATED APPLICATION

This application claims the benefit of U.S. Provisional Application Ser. No. 61/833,301, filed Jun. 10, 2013, which is incorporated herein by reference in its entirety.

BACKGROUND OF THE INVENTION

1. Technical Field

This invention relates generally to static gaskets of the type used to establish a gas/fluid-tight seal between two members to be clamped together and to their method of construction.

2. Related Art

In establishing a gas/fluid-tight seal between two members to be clamped together, such as a cylinder head and engine block, it is common to use a static cylinder head gasket having multiple layers. Generally, at least one of the layers of the multilayer gasket, sometimes referred to as a functional layer, has one or more seal beads to establish a gas/fluid tight seal about openings, such as cylinder bores, coolant openings, and/or bolt openings. Another of the layers, sometimes referred to as a distance layer, is configured to abut the functional layer to facilitate establishing the gas/fluid tight seal about the openings by limiting the compression of the seal beads of the functional layer.

To facilitate compressing the seal beads of the functional layers to the desired height, without over compressing the seal breads, the distance layer is typically formed having raised protrusions formed within the material of the distance layer. The raised protrusions are typically formed in a coining process via a high tonnage forming press. As such, the press plastically deforms the material of the distance layer to form the raised protrusions. Unfortunately, the high tonnage presses used to form the raised protrusions are very expensive, occupy of a large amount of space, and upon being set-up, are dedicated to a specific size and pattern of raised protrusions, thereby requiring a great deal of time and effort to change from one pattern of raised protrusions to another. Further, as a result of plastically deforming the material of the distance layer, the material properties are altered in an unpredictable manner, thereby creating, within the material of the distance layer, unpredictable material properties, which ultimately can lead to premature failure of the distance layer's ability to function as intended. Further yet, having to mechanically upset the material of the distance layer typically results in the raised protrusions having shapes and sizes deviating from the shape and size actually desired, mainly due to tolerances within the distance layer material, as well as tolerances of the press and tools used to form the raised protrusions.

SUMMARY OF THE INVENTION

A metal static gasket is provided. The gasket includes at least one metal layer. The at least one metal layer has opposite sides with at least one through opening extending through the opposite sides configured to register with an opening. At least one metal layer has least one raised annular seal bead. A plurality of protrusions extend outwardly from at least one of the opposite sides, wherein the plurality of protrusions are formed from separate pieces of metal from the at least one metal layer and are individually fixed to the at least one metal layer via separate bond joints.

In accordance with another aspect of the invention, the at least one metal layer is formed as a single metal layer having the raised annular seal bead and the plurality of protrusions are bonded thereto.

In accordance with another aspect of the invention, the at least one metal layer includes at least one metal functional layer with the at least one raised annular seal bead formed therein and a separate metal distance layer, wherein the plurality of protrusions are fixed via the bond joints to at least one of the functional layer and the distance layer.

In accordance with another aspect of the invention, the bond joint can be formed by a weld joint.

In accordance with another aspect of the invention, the bond joint can be formed by an adhesive.

In accordance with another aspect of the invention, at least some of the raised protrusions can differ in height from one another.

In accordance with another aspect of the invention, at least some of the raised protrusions can differ in peripheral shape from one another.

In accordance with another aspect of the invention, the functional layer and the distance layer have a plurality of openings registered with one another and the distance layer has raised protrusions extending about at least a portion of each of the registered openings.

In accordance with another aspect of the invention, the gasket is a cylinder head gasket.

In accordance with another aspect of the invention, a method of constructing a gasket is provided. The method includes providing at least one metal layer having opposite sides and at least one through opening with at least one of the at least one metal layer having at least one raised annular seal bead adjacent the at least one through opening. Further, bonding a plurality of separate pieces of metal to at least one of the opposite sides of the at least one metal layer adjacent the through opening.

In accordance with another aspect of the invention, the method can include forming the gasket from a single metal layer having both the annular seal bead formed therein and the protrusions bonded thereto.

In accordance with another aspect of the invention, the method can include forming the gasket having a functional layer including the at least one annular seal bead formed therein and forming a distance layer separate from the functional layer and having the plurality of metal protrusions bonded to at least one of the functional layer and distance layer.

In accordance with another aspect of the invention, the method can include bonding the metal protrusions to the at least one metal layer via a welding process.

In accordance with another aspect of the invention, the method can include bonding the metal protrusions to the functional layer via a galvanometer welding process.

In accordance with another aspect of the invention, the method can include bonding the metal protrusions to the at least one metal layer via an adhesive.

In accordance with another aspect of the invention, the method can include providing at least some of the metal protrusions having different heights from one another.

In accordance with another aspect of the invention, the method can include providing at least some of the metal protrusions having different peripheral shapes from one another.

In being able to individually bond the protrusions to the metal gasket layer, any number of complex configurations or arrays of the protrusions can be formed quickly and inexpensively in comparison to trying to upset material of the metal gasket layer to arrive at a similar construction. Further, with the individual protrusions being provided as separate pieces of material, the rigidity and material properties of the resulting stopper formed by the array of protrusions is tightly controlled and known, in contrast to that of a plastically upset stopper. Further yet, the setup process used to construct the metal gasket layer having the protrusions bonded thereto is quick and can be readily changed to form different patterns of protrusions, as desired, without undue expense and expenditure of time. Further yet, the equipment used to form the metal gasket layer having the protrusions bonded thereto can be relatively small in size and less expensive as compared to the heavy tonnage presses used to form a coined metal gasket layer. Furthermore, the smaller tonnage press equipment used to form layer(s) of the gasket occupies much less space than that used to formed coined stoppers.

BRIEF DESCRIPTION OF THE DRAWINGS

These and other aspects, features and advantages of a gasket constructed in accordance with the invention and method of construction thereof will become more readily appreciated when considered in connection with the following detailed description of presently preferred embodiments and best mode, appended claims and accompanying drawings, in which:

DETAILED DESCRIPTION OF PRESENTLY PREFERRED EMBODIMENTS

Figure 1:
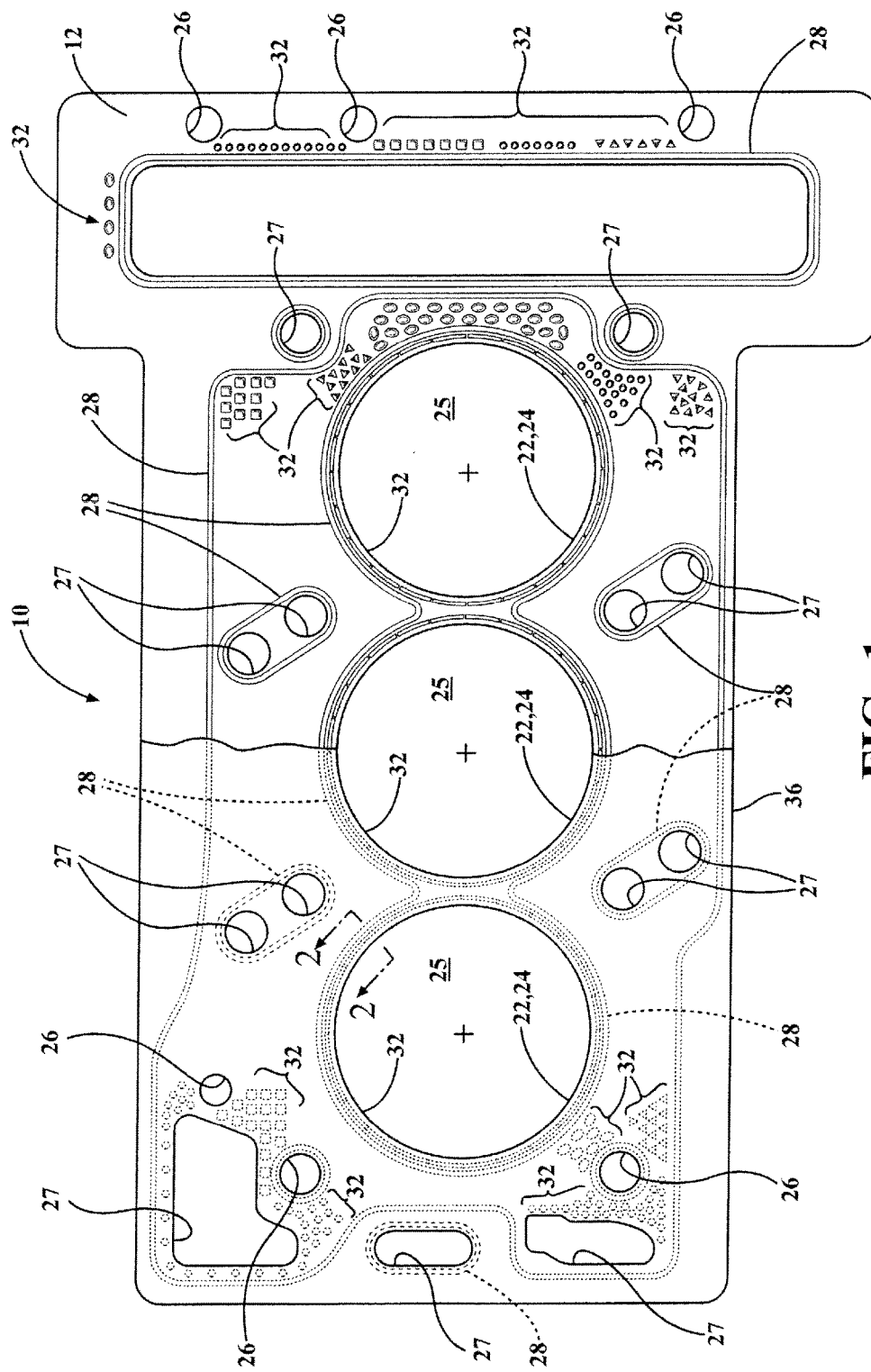
FIG. 1 is a partially broken away plan view of a multilayer gasket constructed in accordance with one aspect of the invention.
Figure 2:
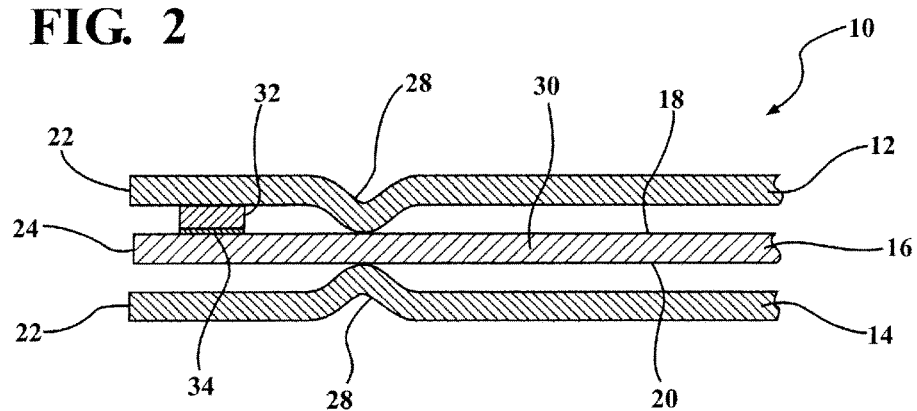
FIG. 2 is a partial cross-sectional view of the gasket of FIG. 1 taken generally along the line 2-2.

Referring in more detail to the drawings, FIG. 1 illustrates a partially broken away plan view of a static gasket 10 constructed in accordance with one aspect of the invention, shown, by way of example and without limitation as a multilayer static gasket, referred to hereafter simply as gasket. The gasket 10 can be constructed as a cylinder head gasket for receipt between an engine block and a cylinder head (not shown), though other sealing applications are contemplated. The gasket 10 has at least one functional layer, and in as shown in cross-section in FIG. 2, by way of example and without limitation, as having a pair of upper and lower functional layers 12, 14, and also shown here, again by way of example and without limitation, as having a central distance layer 16 between the upper and lower functional layers 12, 14. The functional layers 12, 14 are arranged to abut opposite sides 18, 20 of the distance layer 16, such that the distance layer 16 is sandwiched between and in abutment with the functional layers 12, 14, wherein the individual layers 12, 14, 16 can remain separate and detached from one another or they can be fixed to one another, such as by a weld joint, clinch or rivet (not shown), preferably at or adjacent an outermost periphery of the gasket 10. The functional layers 12, 14 each have an opening 22 sized to register with an opening 24 in the distance layer 16, wherein the respective openings 22, 24 are each registered in axial alignment with one another and with a cylinder bore 25 to be sealed. In addition, the functional layers 12, 14 and distance layer 16 have a plurality of additional openings registered with one another, such as in a backland region of the gasket 10 spaced radially outwardly from the cylinder bore 25, wherein the additional openings can constitute bolt openings 26 and coolant or oil passages 27, by way of example and without limitation. The functional layers 12, 14 each have one or more compression beads, such as half and/or full compression seal beads 28 extending outwardly from a generally flat plane of the layers 12, 14 to facilitate establishing a gas-tight seal about the cylinder bore 25 and other openings 26, 27. To further facilitate forming a good and reliable gas-tight seal about the cylinder bore 25 and remaining registered openings 26, 27, at least one of the distance layer 16 and/or the functional layers 12, 14, and shown in FIG. 2 as the distance layer 16, which has a planar body 30 constructed from a planar metal sheet having the opposite sides 18, 20, has a plurality of individual, discrete raised stoppers, also referred to as protrusions 32, extending upwardly and outwardly from at least one of the sides 18, 20 to prevent over-compressing and flattening of the seal beads 28 in the functional layers 12, 14. The protrusions 32 are formed from separate pieces of rigid metal from one another and a separate pieces of material from the respective layer to which they are separately and individually fixedly attached, shown as being attached to a metal sheet body 30 of the distance layer 16, and are fixed to the metal sheet body 30 via a bond joint 34. The height and shaped of the protrusions 32 prevent the seal beads 28, which extend about the cylinder bore 25 and in the backland region, from being completely flattened upon fastening the cylinder head (not shown) to the engine block (not shown). As such, the seal beads 28 are assured of maintaining a generally constant, high and at least partially elastic sealing pressure against the distance layer 16 relative to the remaining portions of the functional layers 12, 14, thereby providing and maintaining a gas-tight seal about the cylinder bore 25 and other registered openings 26, 27.

The functional layers 12, 14 are constructed from a resilient metal, such as spring steel, for example, and can be provided having a thickness of about 0.1 to 0.3 mm, by way of example and without limitation. The functional layers 12, 14 can be constructed having mirrored profiles across the opposite sides 18, 20 of the distance layer 16, with each functional layer 12, 14 having the aforementioned seal beads, such as full seal beads 28 adjacent the cylinder bore 25 and half beads 28 extending in the backland region to an outer periphery portion 36, such as may provide a fluid-tight seal adjacent oil or coolant openings 27, for example.

The body 30 and individually bonded protrusions 32 of the distance layer 16 can be constructed from similar or dissimilar rigid metal materials, such as cold rolled steel or stainless steel, by way of example and without limitation. This is made possible given the body 30 and protrusions 32 are initially constructed as separate pieces of material from one another. The distance layer 16 can be constructed having any desired outer peripheral shape, as needed, to conform to the mating cylinder head and engine block. Similarly, the protrusions can be formed to have any desired height (H) and outer peripheral shape, depending on the precise load characteristics sought.

Upon determining the structural characteristics desired for the gasket 10, the individual protrusions 32, having the desired height (H) and outer peripheral shape, are positioned on the respective layer to which they are intended to be fixedly attached, shown as the distance layer sheet 30, in precise desired locations and fixed in position to the body 30 via the bond joints 34. It is contemplated that the optimal bonding process includes using a surface mount technology including a galvanometer laser welding process (galvo laser) to form the welded bond joints 34 to fix the protrusions 32 in their precise locations. The welding process not only precisely locates the protrusions 32, but also assures that the protrusions 32 retain their precise height (H) and peripheral shape without being deformed, thereby retaining their rigidity and full functionality to provide the intended compression loading across the gasket layers 12, 14, 16 in use. Accordingly, the compression loading across the gasket 10 can be precisely controlled and distributed to account for any deflections anticipated in use, whether due to fasteners or expansion/contraction resulting from thermal affects. In addition to providing the ability to produce a gasket with precise loading characteristics, the galvo laser welding process is readily adaptable to make quick changes from one gasket platform to another, and thus, is economical. Further economies are recognized by the speed with which the high speed galvo laser welding process can be performed, wherein it is contemplated that up to about 125,000 protrusions 32 or more can be welded per hour on a single high speed galvo laser welding apparatus. As such, the individual protrusions 32 fixed to each distance layer sheet 30 are fixed at substantially the same time with one another.

Figure 3:
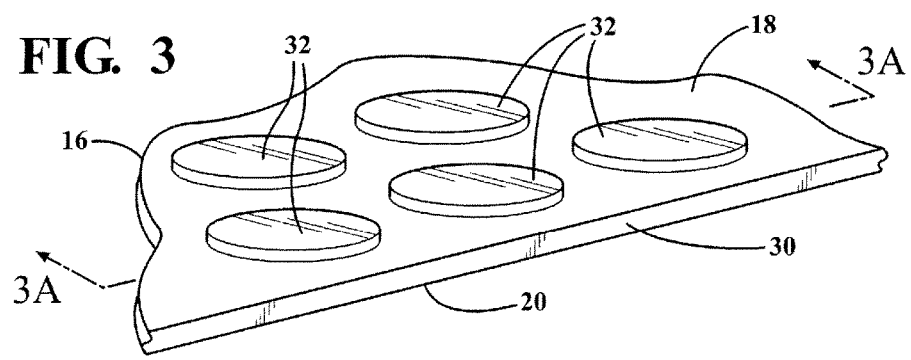
FIG. 3 is a partial perspective view of a distance layer of the gasket of FIG. 1 constructed in accordance with one aspect of the invention.
Figure 3A:
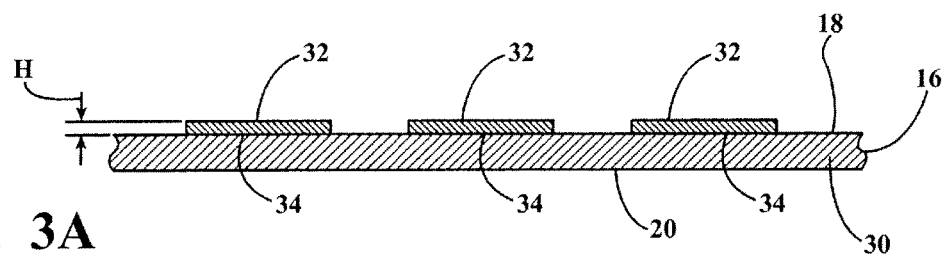
FIG. 3A is a side view of the distance layer of FIG. 3.
Figure 4:
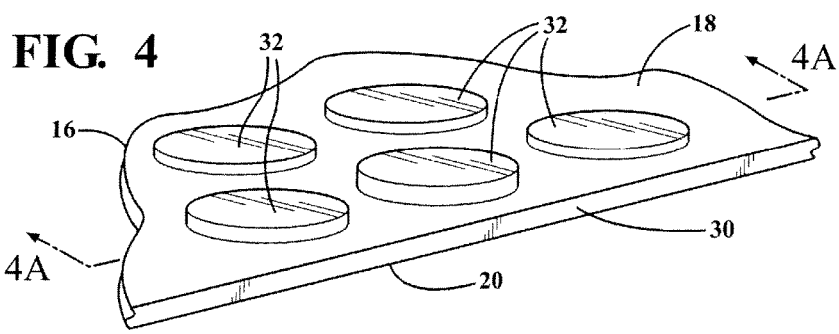
FIG. 4 is a partial perspective view of a distance layer constructed in accordance with another aspect of the invention.
Figure 4A:
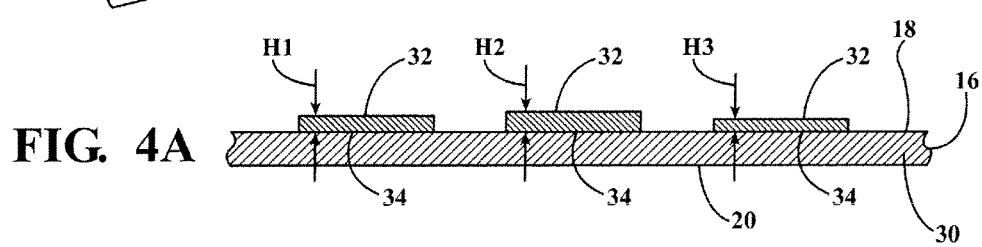
FIG. 4A is a side view of the distance layer of FIG. 4.
Figure 5A:
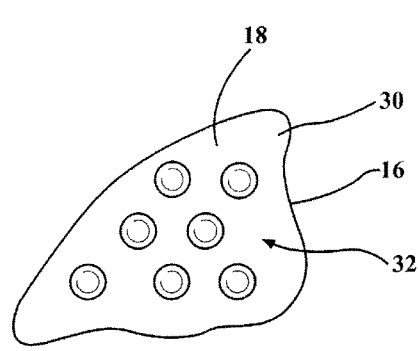
FIGS. 5A-5D shown plan views of a portion of a distance layer constructed in accordance with another aspect of the invention.
Figure 5B:
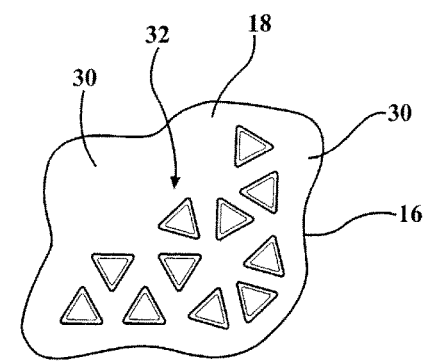
Figure 5C:
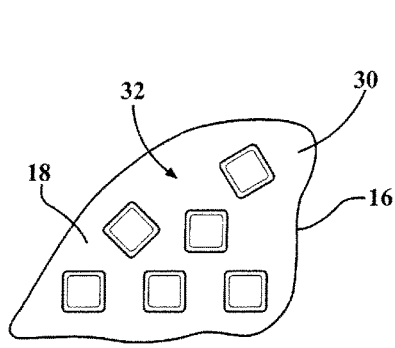
Figure 5D:
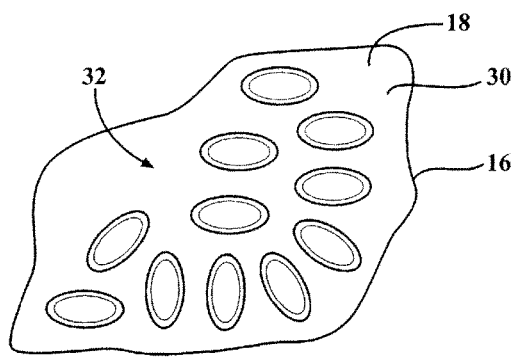
Figure 6A:
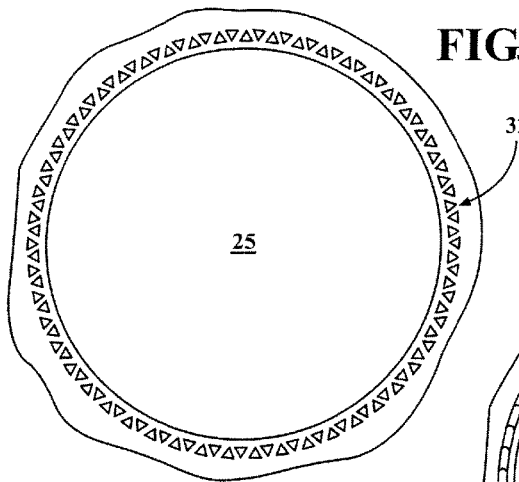
FIGS. 6A-6I show plan views of a portion of a distance layer constructed in accordance with yet another aspect of the invention.
Figure 6B:
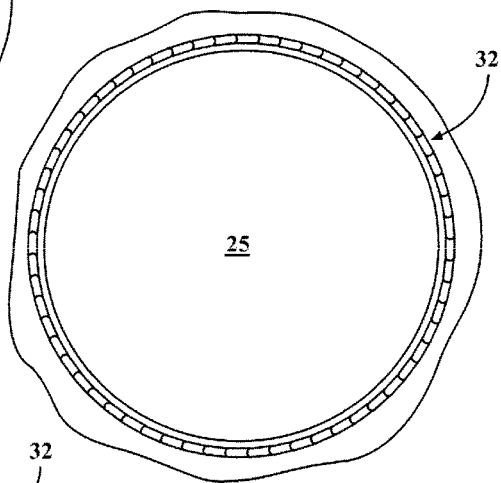
Figure 6C:
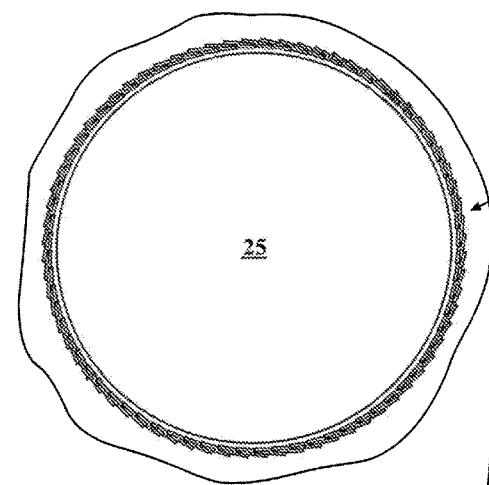
Figure 6D:
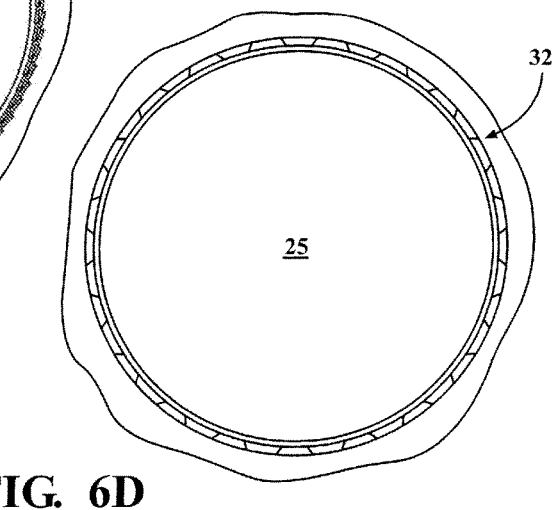
Figure 6E:
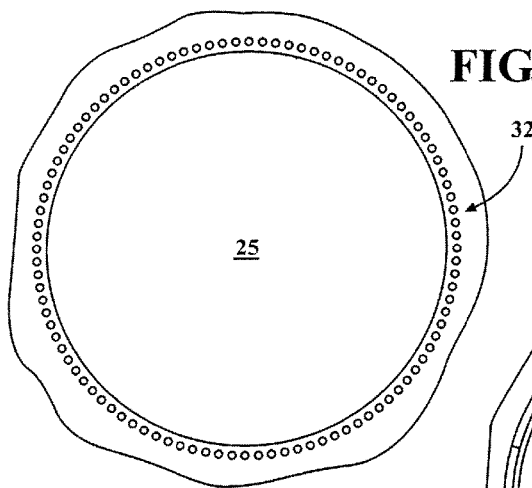
Figure 6F:
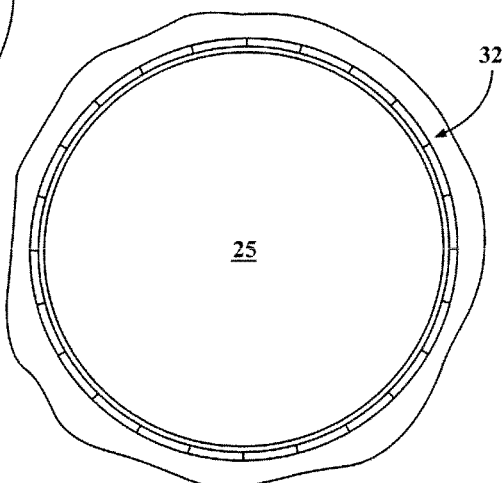
Figure 6G:
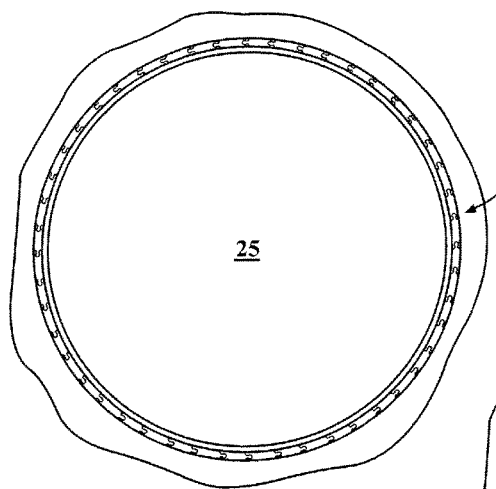
Figure 6H:
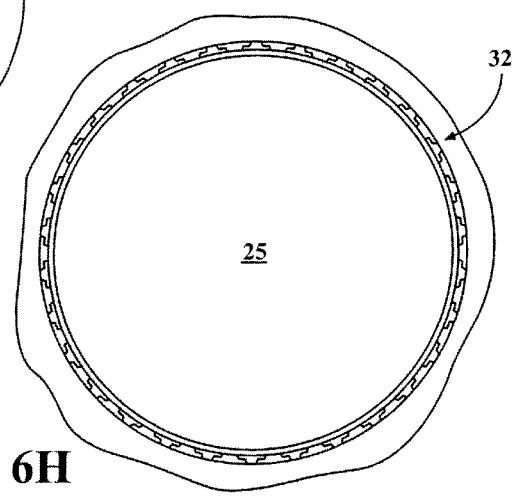
Figure 6I:
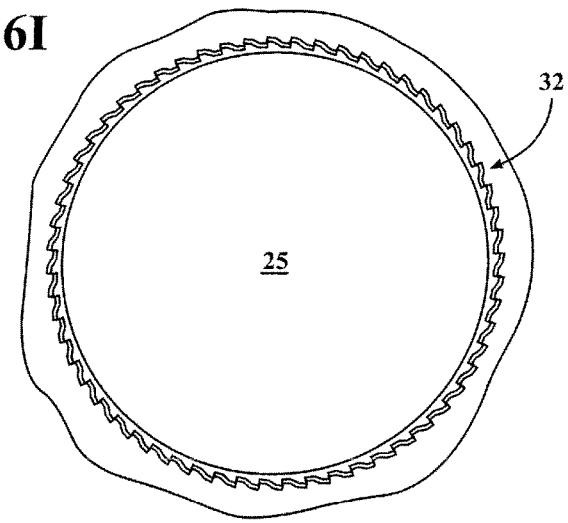

As shown in FIGS. 3 and 3A, the protrusions 32 can be provided having the same height (H) within a particular region of the distance layer 16 or across the full distance layer 16, or as shown in FIGS. 4 and 4A, the protrusions 32 can be provided having different heights (H1, H2, H3 . . . ) from one another within any desired region of the distance layer 16. Further, as shown in FIGS. 5A-5D, the protrusions can be provided having any desired outer peripheral shape, shown as being circular, triangular, square and oval, by way of example and without limitation. Of course, it should be recognized that any combination of height (H) and outer peripheral shape of protrusions 32 can be provided at any desired location on the distance layer body 30. As such, a precise load distribution can be quickly and easily formed across the gasket 10 by knowing the anticipated performance characteristics, e.g. clamping forces, thermal affects, and engine distortion, in the given application, simply by fixing the desired height (H) and shape protrusion 32 to in the desired location.

In FIGS. 6A-6I, a variety of additional shapes of protrusions 32 are shown fixed about the cylinder bore 25. As such, it can be seen that virtually any desired configuration of protrusion 32 can be provided, as desired, particularly given the ability to fix each protrusion 32 to the body 30 separately from one another via the individual bond joints 34.

Figure 7:
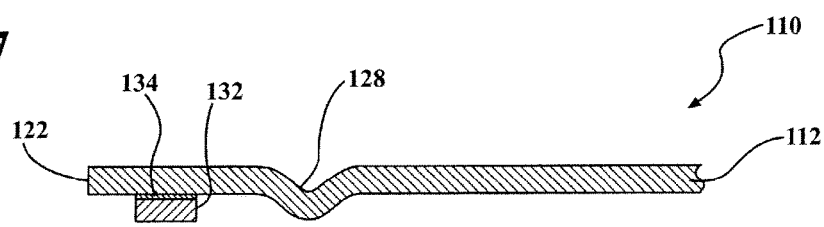
FIG. 7 is a view similar to FIG. 2 of a gasket constructed in accordance with yet another aspect of the invention.

In FIG. 7, a gasket 110 constructed in accordance with another aspect of the invention is shown, wherein the same reference numeral are used as above, offset by a factor of 100, to identify like features.

The gasket 110 is formed as a single metal layer, functioning as both a functional layer 112 having one or more compression beads, such as half and/or full compression seal beads 128 to facilitate establishing a gas-tight seal about an opening to be sealed, as discussed above. The gasket 110 further includes a plurality of individual raised stoppers, also referred to as protrusions 132, extending upwardly and outwardly from at least one of the sides of the layer 112 to prevent an over-compression, flattening of the seal beads 128. As discussed above with regard to the protrusions 32, the protrusions 132 are formed from separate pieces of rigid metal from the material of the functional layer 112 and, upon being formed having the desired height (H) and outer peripheral shape, are subsequently fixed to the material of the functional layer 112 via a bond joint 134. The protrusions 132 function as discussed above to prevent the seal beads 128 from being completely flattened upon fastening the members in clamped relation with one another. It should be recognized that the function layer 112 can be used by itself, or with other functional layers and/or with a distance layer.

Figure 8:
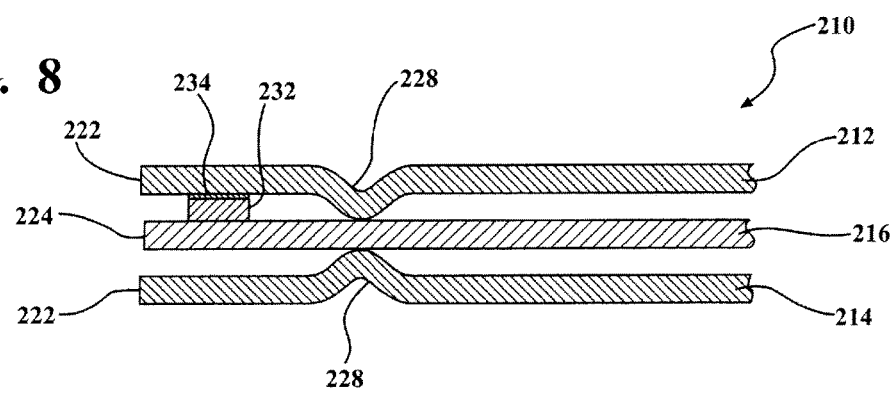
FIG. 8 is a view similar to FIG. 2 of a gasket constructed in accordance with yet another aspect of the invention.

In FIG. 8, a gasket 210 is shown constructed in accordance with another aspect of the invention, wherein the same reference numerals are used as above, offset by a factor of 200, to identify like features. The gasket 210 is structurally similar to the gasket 10, however, rather than protrusions 232 being bonded to the distance layer 216, the protrusions 232 are bonded to at least one of the functional layers 212, 214, and are shown as being bonded to the upper functional layer 212 via a bond joint 234 to prevent over-compression of the seal bead 228. Otherwise, the gasket 210 is the same as that discussed above for gasket 10.

Obviously, many modifications and variations of the present invention are possible in light of the above teachings. It is, therefore, to be understood that within the scope of the appended claims and any claims ultimately allowed, the invention may be practiced otherwise than as specifically described.

What is claimed is:

1. A static gasket, comprising:
   at least one metal layer having opposite sides and at least one through opening extending through said opposite sides, at least one of said at least one metal layer having a raised annular seal bead extending about said at least one through opening; and
   a plurality of protrusions extending outwardly from at least one of said opposite sides between said at least one through opening and said raised annular seal bead to prevent the complete flattening of said raised annular seal bead, said plurality of protrusions being constructed from separate pieces of metal from one another and from said at least one metal layer and being individually fixed to said at least one metal layer via separate bond joints.

2. The static gasket of claim 1 wherein said at least one metal layer is formed as a single metal layer having said raised annular seal bead formed therein and having said plurality of protrusions fixed thereto.

3. The static gasket of claim 2 wherein at least some of said plurality of protrusions have different heights extending outwardly from said single metal layer from one another.

4. The static gasket of claim 2 wherein at least some of said plurality of protrusions have differently shaped outer peripheries from one another.

5. The static gasket of claim 1 wherein said at least one metal layer includes at least one metal functional layer with said at least one raised annular seal bead formed therein and a separate metal distance layer, said plurality of protrusions being fixed via said bond joints to at least one of said functional layer and said distance layer.

6. The static gasket of claim 5 wherein said metal distance layer has opposite sides with said plurality of protrusions being fixed via said bond joints to at least one of said opposite sides of said distance layer.

7. The static gasket of claim 5 wherein said plurality of protrusions are fixed to said at least one metal functional layer adjacent said at least one raised annular seal bead.

8. The static gasket of claim 1 wherein said bond joints are weld joints.

9. The static gasket of claim 1 wherein at least some of said protrusions have different heights from one another.

10. The static gasket of claim 1 wherein at least some of said protrusions have different outer peripheral shapes from one another.

11. A method of constructing a static gasket, comprising:
providing at least one metal layer having opposite sides and at least one through opening with at least one of said at least one metal layer having at least one raised annular seal bead adjacent said at least one through opening; and
bonding a plurality of separate pieces of metal to at least one of said opposite sides of said at least one metal layer between said through opening and said at least one raised annular seal bead to prevent the complete flattening of said at least one raised annular seal bead.

12. The method of claim 11 further including providing at least one of said at least one metal layer as a functional layer having the at least one raised annular seal bead formed therein and providing another of said at least one metal layer as a separate distance layer, and bonding the plurality of separate pieces of metal to at least one of said functional layer and said distance layer.

13. The method of claim 12 further including bonding the plurality of separate pieces of metal to said functional layer adjacent said seal bead.

14. The method of claim 12 further including bonding the plurality of separate pieces of metal to said distance layer.

15. The method of claim 11 further including performing the bonding via weld joints.

16. The method of claim 15 further including using a galvanometer laser welding machine to form the weld joints.

17. The method of claim 11 further including performing the bonding with an adhesive.

18. The method of claim 11 further including providing at least some of the pieces of metal having different heights from one another.

19. The method of claim 11 further including providing at least some of the pieces of metal having different outer peripheral shapes from one another.

20. The method of claim 11 further including bonding the plurality of separate pieces of metal to the at least one metal layer at substantially the same time.

* * * * *